M. COOPER.
Fertilizer-Distributers and Seed-Planters.
No. 155,011. Patented Sept. 15, 1874.
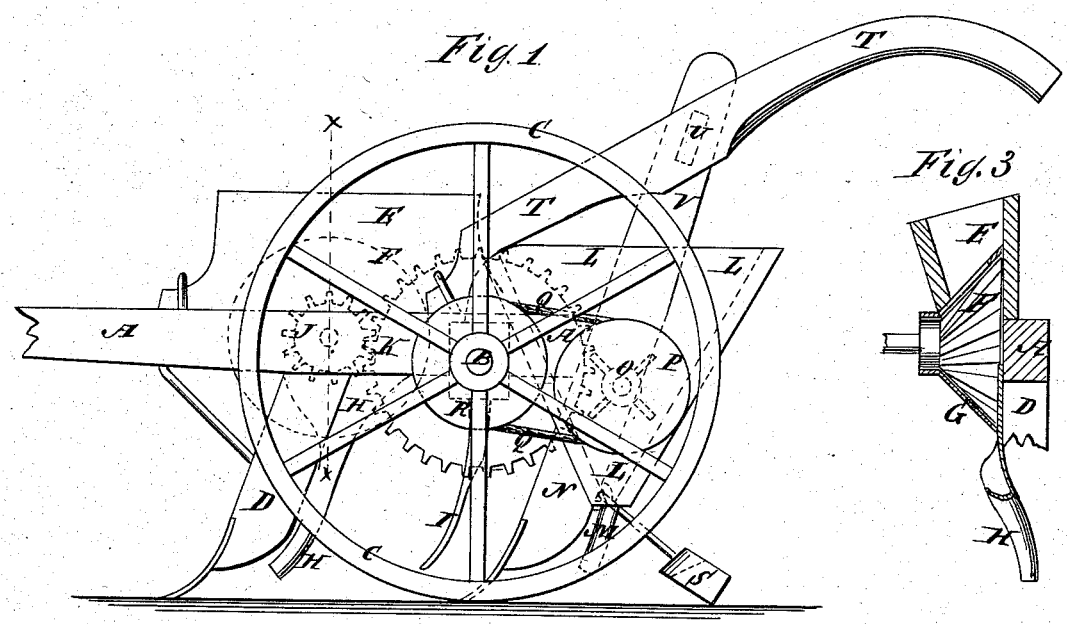
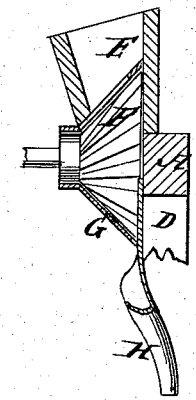
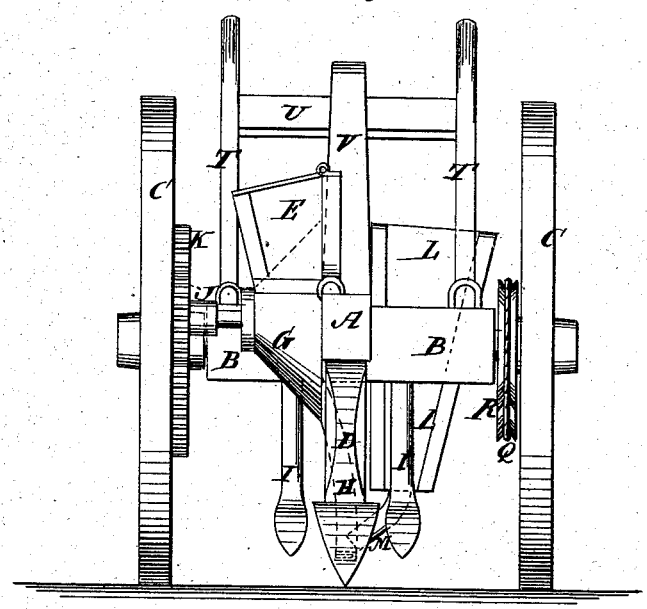
WITNESSES:
INVENTOR:
BY
ATTORNEYS.

UNITED STATES PATENT OFFICE.

MARK COOPER, OF GREENVILLE C. H., SOUTH CAROLINA.

IMPROVEMENT IN FERTILIZER-DISTRIBUTERS AND SEED-PLANTERS.

Specification forming part of Letters Patent No. 155,011, dated September 15, 1874; application filed June 20, 1874.

*To all whom it may concern:*

Be it known that I, MARK COOPER, of Greenville C. H., in the county of Greenville and State of South Carolina, have invented a new and useful Improvement in Fertilizer-Distributer and Seed-Planter, of which the following is a specification:

Figure 1 is a side view of my improved machine. Fig. 2 is a front view of the same. Fig. 3 is a detail section of the same, taken through the line $x\ x$, Fig. 1.

Similar letters of reference indicate corresponding parts.

My invention has for its object to furnish an improved machine which shall be so constructed as to open a deep furrow, grind and distribute a fertilizer in said furrow, and cover it with soil, open a shallower furrow above the fertilizer, distribute the seed in the furrow, and cover it with soil.

The invention will first be fully described, and then pointed out in the claim.

A represents a beam, which is attached to the middle part of an axle, B, upon the journals of which are placed wheels C. To the beam A, a little in front of the axle B, is attached a standard, D, for the plow, to open the furrow to receive the fertilizer, which is placed in the hopper E, attached to the side of the beam A near the upper end of the standard D. In the bottom of the hopper E is placed a grinding-wheel, F, surrounded by a case, G, by which the fertilizer is ground, and from which it passes to the furrow directly in the rear of the standard D through a conducting-spout, H. The furrow is filled and the fertilizer is covered by two plows, I, attached to the axle B. To the shaft of the grinding-wheel F is attached a small gear-wheel, J, the teeth of which mesh into the teeth of the large gear-wheel K formed upon or attached to the wheel C, so that the grinding-wheel F may be operated by the advance of the machine. To the beam A in the rear of the axle B, and upon the opposite side of the said beam from the hopper E, is attached a second hopper, L, to receive the cotton-seed or other seed to be planted, and from which the said seed passes, through the spout M, into the furrow opened by the plow attached to the standard N, which is made a little shorter than the standard D, so that its plow, when opening a furrow to receive the seed, may not go quite down to the fertilizer, the seed being deposited directly above said fertilizer. The seed is agitated in the hopper L and caused to pass out regularly by a shaft, O, which revolves within it, and is armed with prongs or fingers. To one end of the stirrer-shaft O is attached a pulley, P, around which passes a band, Q, which also passes around a pulley, R, attached to the wheel C, so that the said stirrer may be operated by the advance of the machine. The seed is covered by a covering block or plow, S, attached to the lower part of the standard N, or to some other suitable support. T are the handles, the forward ends of which are attached to the axle B, and their rear parts are attached to the ends of a cross-bar or round, U, the middle part of which is attached to the upper end of the upright V, which is attached to the rear end of the beam A, and which may be the upward extension of the standard N.

Having thus described my invention, I claim as new and desire to secure by Letters Patent—

The combination, with a manure-hopper, E, and delivery-spout H, of the intermediate fluted conical grinding-burr F and correspondingly-shaped shell G, having slit at top and bottom, as and for the purpose specified.

MARK COOPER.

Witnesses:
C. S. HENNING,
W. B. MCDANIEL.